US008027488B2

(12) United States Patent
Pompei

(10) Patent No.: US 8,027,488 B2

(45) Date of Patent: Sep. 27, 2011

(54) PARAMETRIC AUDIO SYSTEM

(75) Inventor: F. Joseph Pompei, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 1671 days.

(21) Appl. No.: 11/180,390

(22) Filed: Jul. 13, 2005

(65) Prior Publication Data

US 2005/0248233 A1 Nov. 10, 2005

Related U.S. Application Data

(63) Continuation of application No. 09/300,022, filed on Apr. 27, 1999, now abandoned, which is a continuation-in-part of application No. 09/116,271, filed on Jul. 16, 1998, now abandoned.

(51) Int. Cl.

*H04R 3/00* (2006.01)
*H04B 3/00* (2006.01)
*H04B 1/02* (2006.01)

(52) U.S. Cl. .......... 381/111; 381/77; 381/112; 381/116; 367/137

(58) Field of Classification Search .................... 381/77, 381/111, 112, 116, 11; 367/137, 99
See application file for complete search history.

(56) References Cited

U.S. PATENT DOCUMENTS 3,373,251 A 3/1968 Seeler
3,398,810 A 8/1968 Clark, III
3,565,209 A 2/1971 Babcock et al.
3,816,671 A 6/1974 Fraim et al.
3,908,098 A 9/1975 Kawakami et al.
4,005,382 A 1/1977 Beaver
4,081,626 A 3/1978 Muggli et al.
4,122,725 A 10/1978 Thompson
4,169,219 A 9/1979 Beard
4,190,818 A 2/1980 Follin et al.
4,246,449 A 1/1981 Biber
4,258,332 A 3/1981 West
4,289,936 A 9/1981 Civitello (Continued)

FOREIGN PATENT DOCUMENTS

DE 28 41 680 7/1980

(Continued)

OTHER PUBLICATIONS

Kuhl, W. et al., Acustica, vol. 4, No. 5, "Condenser Transmitters and Microphones with Solid Dielectric for Airborne Ultrasonics," Physikalisches Institut der Universität Göttingen, pp. 519-532 (1954).

(Continued)

*Primary Examiner* — Devona Faulk

(74) *Attorney, Agent, or Firm* — Hamilton, Brook, Smith & Reynolds, P.C.

(57) ABSTRACT

Ultrasonic signals are used to transmit sounds from a modulated ultrasonic generator to other locations from which the sounds appear to emanate. In particular, an ultrasonic carrier is modulated with an audio signal and demodulated on passage through the atmosphere. The carrier frequencies are substantially higher than those of prior systems, e.g., at least 60 kHz, and the modulation products thus have frequencies which are well above the audible range of humans; as a result, these signals are likely harmless to individuals who are within the ultrasonic fields of the system. The signals may be steered to moving locations, and various measures are taken to minimize distortion and maximize efficiency.

9 Claims, 13 Drawing Sheets

U.S. PATENT DOCUMENTS

| | | | | |
|---|---|---|---|---|
| 4,311,881 | A | | 1/1982 | Reynard |
| 4,323,736 | A | | 4/1982 | Strickland |
| 4,404,489 | A | | 9/1983 | Larson, III et al. |
| 4,492,825 | A | | 1/1985 | Brzezinski et al. |
| 4,581,726 | A | * | 4/1986 | Makino et al. .................. 267/99 |
| 4,588,917 | A | | 5/1986 | Ratcliff |
| 4,603,408 | A | | 7/1986 | Singhal et al. |
| 4,607,145 | A | | 8/1986 | Ravinet et al. |
| 4,695,986 | A | | 9/1987 | Hossack |
| 4,823,908 | A | * | 4/1989 | Tanaka et al. ................. 181/175 |
| 4,887,248 | A | | 12/1989 | Griebeler |
| 4,963,782 | A | | 10/1990 | Bui et al. |
| 4,991,221 | A | | 2/1991 | Rush |
| 5,161,128 | A | | 11/1992 | Kenney |
| 5,287,331 | A | | 2/1994 | Schindel et al. |
| 5,298,828 | A | | 3/1994 | Radovanovich |
| 5,321,332 | A | | 6/1994 | Toda |
| 5,338,287 | A | | 8/1994 | Miller et al. |
| 5,345,510 | A | | 9/1994 | Singhi et al. |
| 5,347,495 | A | | 9/1994 | Cherek et al. |
| 5,394,732 | A | | 3/1995 | Johnson et al. |
| 5,406,503 | A | | 4/1995 | Williams, Jr. et al. |
| 5,488,954 | A | | 2/1996 | Sleva et al. |
| 5,539,705 | A | | 7/1996 | Akerman et al. |
| 5,598,480 | A | | 1/1997 | Kim |
| 5,600,610 | A | | 2/1997 | Hill et al. |
| 5,619,476 | A | | 4/1997 | Haller et al. |
| 5,745,438 | A | | 4/1998 | Hill et al. |
| 5,859,915 | A | | 1/1999 | Norris |
| 5,870,351 | A | | 2/1999 | Ladabaum et al. |
| 5,885,129 | A | | 3/1999 | Norris |
| 5,910,991 | A | | 6/1999 | Farrar |
| 5,982,709 | A | | 11/1999 | Ladabaum et al. |
| 5,991,239 | A | * | 11/1999 | Fatemi-Booshehri et al. ............................ 367/164 |
| 6,016,351 | A | | 1/2000 | Raida et al. |
| 6,044,160 | A | | 3/2000 | Norris |
| 6,052,336 | A | | 4/2000 | Lowrey, III |
| 6,108,433 | A | | 8/2000 | Norris |
| 6,115,475 | A | | 9/2000 | Alexander |
| 6,229,899 | B1 | | 5/2001 | Norris et al. |
| 6,243,471 | B1 | | 6/2001 | Brandstein et al. |
| 6,445,804 | B1 | | 9/2002 | Hirayanagi |
| 6,556,687 | B1 | | 4/2003 | Manabe |
| 6,584,205 | B1 | | 6/2003 | Croft, III et al. |
| 6,678,381 | B1 | | 1/2004 | Manabe |
| 2001/0007591 | A1 | | 7/2001 | Pompei |

FOREIGN PATENT DOCUMENTS

| | | | | |
|---|---|---|---|---|
| EP | 0 420 500 | B1 | | 4/1991 |
| EP | 0 696 791 | A2 | | 2/1996 |
| EP | 0 973 149 | A2 | | 1/2000 |
| EP | 0 973 152 | A2 | | 1/2000 |
| GB | 1 234 767 | | | 6/1971 |
| GB | 2151025 | A | | 7/1985 |
| JP | 54-034662 | | | 3/1979 |
| JP | 58-119293 | | | 7/1983 |
| JP | 59171300 | | | 9/1984 |
| JP | A 60-150399 | | | 8/1985 |
| JP | S61-118096 | | | 6/1986 |
| JP | S61118096 | | * | 6/1986 |
| JP | 2-162999 | | | 6/1990 |
| JP | 05240944 | A | * | 9/1993 |
| JP | 06161476 | | | 6/1994 |
| JP | 7-107588 | | | 4/1995 |
| JP | 7-334175 | | | 12/1995 |
| JP | 08149592 | | | 6/1996 |
| JP | 11-27774 | | | 1/1999 |
| JP | 11-145915 | | | 5/1999 |
| JP | 11-262084 | | | 9/1999 |
| JP | 11-285092 | | | 10/1999 |
| JP | 2000-209691 | | | 7/2000 |
| JP | 2000-224687 | | | 8/2000 |
| WO | WO 98/02978 | | | 1/1998 |
| WO | WO 00/11911 | A1 | | 3/2000 |
| WO | WO 01/08449 | A1 | | 2/2001 |
| WO | WO 01/15491 | A1 | | 3/2001 |

OTHER PUBLICATIONS

Nakamura, Akira, ed., Proceedings of the 10th International Symposium on Nonlinear Acoustics, "On the Feasibility of Narrow Beam Speech Transmission in Air Using Non Linear Interaction of Ultrasonic Waves," Bindal Vishwa Nath. Saksena Tribhuwan Kimar and Mukesh Chandra, National Physical Laboratory, Hillside Road, New Delhi-110012, India, pp. 141-145 (1984).

European Patent Office: Communication pursuant to Article 96(2) EPC; Applicant: Massachusetts Institute of Technology; Application No. 99 305 632.4-2213, Ref. D037395PEP, dated Apr. 30, 2003, and the claims to which it relates.

European Patent Office: Communication pursuant to Article 96(2) EPC; Applicant: Massachusetts Institute of Technology; Application No. 99 305 632.4-1240, Ref. D037395PEP, dated Jul. 25, 2002, and the claims to which it relates.

Yoneyama et al., "The Audio Spotlight: An Application of Nonlinear Interaction of Sound Waves to a New Type of Loudspeaker Design," *J. Acoust. Soc. Am.*, 73(5), 1532-1536 (1983).

Mattila et al., "Bandwidth Control of an Electrostatic Ultrasonic Transducer," *Sensors and Actuators A*, 45, 203-208 (1994).

Bass et al., "Atmospheric Absorption of Sound: Update," *J. Acoust. Soc. Am.*, 88(4), 2019-2021 (1990).

Biber et al., "The Polaroid Ultrasonic Reanging System," *67th Conv. of Audio Eng. Soc.* (1980).

Piquette, "A Fully Mechanical Linear Transducer Model with Application to Generalizing the Nonlinear Hunt Electrostatic Transducer for Harmonic and Transient Suppression," , *J. Acoust. Soc. Am.*, 98(1), 422-430 (1995).

Suzuki et al., *IEEE Trans. Ultrason, Ferroel, and Freq. Cont.*, "A Silicon Electrostatic Ultrasonic Transducer," 36(6), 620-627 (1989).

Manthey et al., "Ultrasonic Transducers and Transducer Arrays for Applications in Air," *Meas. Sci. Technol. 3*, at 249-261 (1992).

Carr, "Diagnostic Measurements in Capacitive Transducers," *Ultrasonics 1993*, 31(1), 13-20 (1993).

Kamakura, T., et al., "Suitable Modulation of the Carrier Ultrasound for a Parametric Loudspeaker," *Acustica 73*:215-217 (1991).

Preliminary Opinion of the Board of Appeal (Communication pursuant to Article 15(1) RPBA) issued in European Application No. 99305632.4, dated May 26, 2010 (14 pages).

* cited by examiner

PARAMETRIC AUDIO SYSTEM

CROSS REFERENCE TO RELATED APPLICATIONS

This is a continuation of U.S. patent application Ser. No. 09/300,022 filed Apr. 27, 1999 now abandoned entitled PARAMETRIC AUDIO SYSTEM, which is a continuation-in-part of U.S. patent application Ser. No. 09/116,271 filed Jul. 16, 1998 now abandoned entitled PARAMETRIC AUDIO SYSTEM.

STATEMENT REGARDING FEDERALLY SPONSORED RESEARCH OR DEVELOPMENT

N/A

FIELD OF THE INVENTION

This invention relates to the projection of audio signals to apparent sources removed from the transducers that generate these signals. More specifically, it relates to a parametric sound system that directs an ultrasonic beam, modulated with an audio signal, toward a desired location, with non-linearity of the atmospheric propagation characteristics demodulating the signal at locations distant from the signal source.

BACKGROUND OF THE INVENTION

It is well known that an ultrasonic signal of sufficiently high intensity, amplitude-modulated with an audio signal, will be demodulated on passage through the atmosphere, as a result of a non-linear propagation characteristics of the propagation medium. Prior systems based on this phenomenon have been used to project sounds from a modulated ultrasonic generator to other locations from which the sounds appear to emanate. Specifically, arrays of ultrasonic transducers have been proposed for projecting audio-modulated ultrasonic beams, which can be steered to move the locations of the apparent sources of the demodulated audio contents. Moreover, the audio signals regenerated along the path of the ultrasonic beam are characterized by directivity corresponding to that of the beam. The signals can thus be directed to a particular location, with the audio signals being received at that location and not at other locations disposed away from the beam axis.

The directivity of the audio signals is maintained when the ultrasonic beam is reflected from a surface and, in fact, a proposed beam steering arrangement involves the use of a rotatable reflecting surface. On the other hand, if the beam is projected to a surface that absorbs acoustical energy at ultrasonic frequencies but reflects it at audio frequencies, the audio content of the signal will be reflected with reduced directivity, with the sound appearing to originate at the point of reflection. These characteristics give rise to a number of highly useful applications of these systems. For example, one may direct the ultrasonic beam so as to track a moving character that is projected on a screen and the apparent source of the sound will move across the screen along with the character. One may project the beam at a stationary or moving individual in an area in which other individuals are also positioned and the demodulated sound will be heard by that individual, largely to the exclusion of others. Similarly, one may project the beam into an area so that individuals who pass into the area will receive a message keyed to that location. For example, in an art gallery, messages keyed to individual paintings may be projected into the areas in front of the paintings.

With such useful applications for parametric sonic beam technology, one would expect it to have a wide commercial application. This has not been the case, however, and it appears that several factors have militated against commercial acceptance. For example, the transducer arrays that project the ultrasonic beams have heretofore been expensive to manufacture and characterized by low efficiency converting electrical energy into acoustical energy, resulting in bulky and cumbersome systems.

Moreover, the transducers have been characterized by a narrow bandwidth, making it difficult to compensate for distortion as discussed herein.

Another deficiency in prior systems has been the use of a relatively low ultrasonic carrier frequency, e.g., 40 kHz, which can result in modulation components whose frequencies are close to the upper limit of human audibility. Thus the intensities of these components can be such as to damage human hearing without the victims being aware of the high-intensity environment and thus being unaware of the harm to which they are subjected. Moreover, these components are well within the hearing range of household pets and can be very annoying or harmful to them as well. With inefficient transducers it is impractical to use higher frequencies, since atmospheric absorption of ultrasonic energy increases rapidly as a function of frequency.

SUMMARY OF THE INVENTION

A parametric system incorporating the invention uses carrier frequencies substantially higher than those of prior systems. Specifically, I prefer to use a carrier frequency of at least 60 kHz. The modulation products thus have frequencies which are well above the audible range of humans and these signals are therefore likely harmless to individuals who are within the ultrasonic fields of the system. It should be emphasized that, as used herein, the term “modulation” refers broadly to the creation of an ultrasonic signal in accordance with an information-bearing signal, whether or not the information-bearing signal is actually used to modify the carrier; for example, the composite signal (i.e., the varied carrier) may be synthesized de novo.

To generate the ultrasonic signals I prefer to use membrane transducers, which couple to the atmosphere more efficiently than the piezoelectric transducers characteristic of prior systems. The preferred membrane transducers are electrostatic transducers. However, membrane type piezoelectric transducers, operating in a transverse mode, are also effective. The transducers are preferably driven with circuits in which the capacitances of the transducers resonate with circuit inductances at the acousto-mechanical resonant frequencies of the transducers. This provides a very efficient transfer of electrical energy to the transducers, thereby facilitating the use of relatively high carrier frequencies.

The high efficiency and versatility of the transducers described herein also makes them suitable for other ultrasonic applications such as ranging, flow detection, and nondestructive testing.

The efficiency of the system can be further increased by varying the power of the ultrasonic carrier, as described below, so as to provide essentially 100 percent modulation at all audio levels. Thus, at lower audio levels, the carrier level is reduced from that required for higher audio levels, resulting in a substantial reduction in power consumption.

Preferably a plurality of transducers are incorporated into a transducer module and the modules are arranged and/or electrically driven so as to provide, in effect, a large radiating surface and a large non-linear interaction region. With this arrangement, the system can generate a relatively high sound level without an unduly high beam intensity, as might be the case with the use of a transducer arrangement having a smaller radiating surface and interaction region, which is driven to generate a higher ultrasonic intensity to accomplish the same level of audible energy transmission. The transmitted beam can be steered either by physically rotating the array or using a rotatable reflecting plate, or by altering the phase relationships of the individual transducer modules in the array.

Atmospheric demodulation, on which parametric audio systems rely to derive the audio signals from the ultrasonic beam, results in quadratic distortion of the audio signals. To reduce this distortion the audio signals have been preconditioned, prior to modulation, by passing them through a filter whose transfer function is the square root of the offset, integrated input audio signal. I have found that when sound effects or certain types of music are used, pleasant effects can be sometimes obtained by omitting some of the preconditioning, or by overmodulating the carrier. When the resulting ultrasonic beam is demodulated by the atmosphere, the music or sound effects have enhanced harmonic effects, and are created more efficiently, and are therefore substantially louder for a given ultrasonic intensity.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
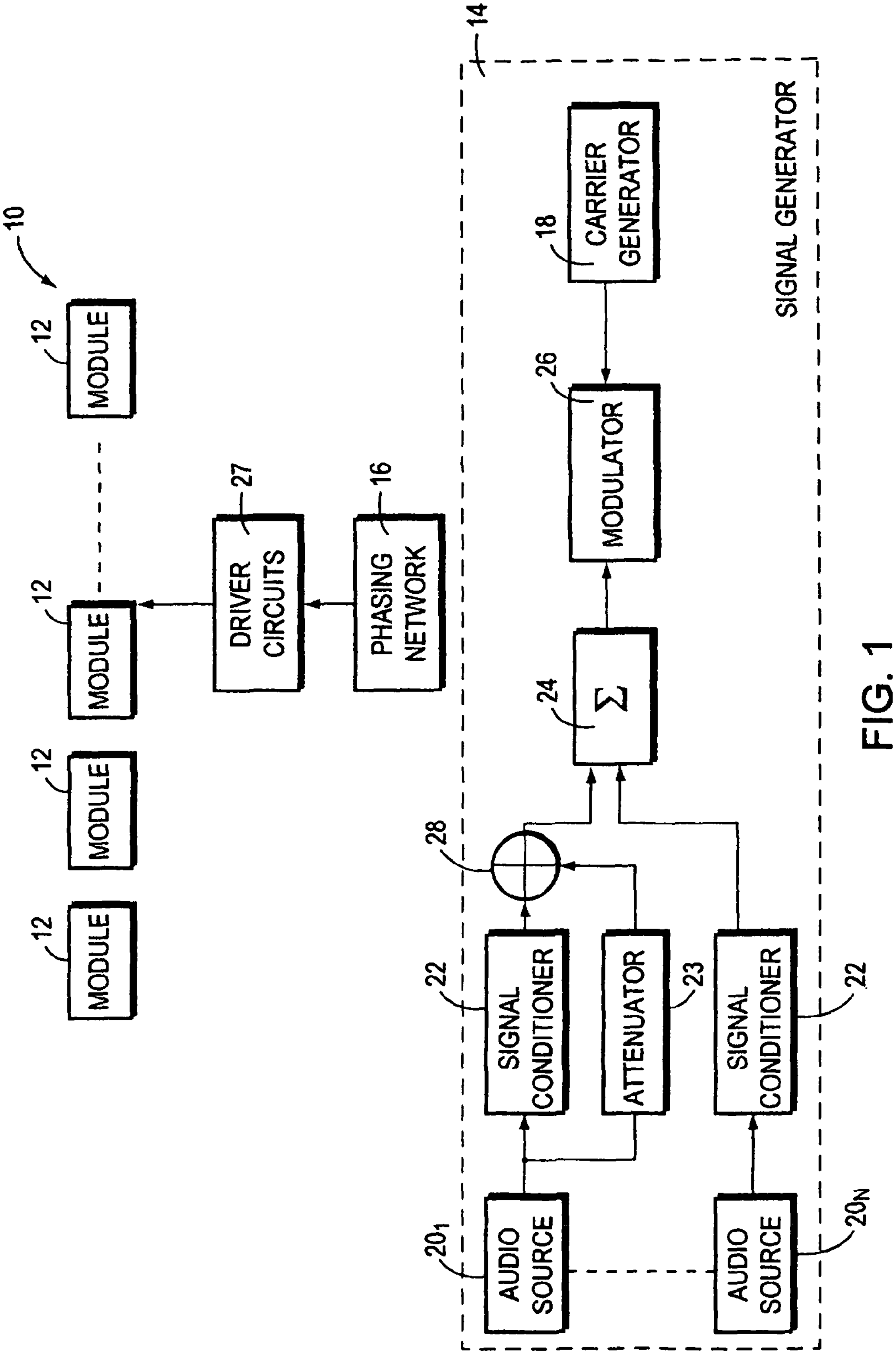
FIG. 1 is a schematic diagram of a parametric sound system incorporating the invention.

As shown in FIG. 1 a parametric sound system embodying the invention includes a transducer array 10 comprising a plurality of ultrasonic transducer modules 12 arranged in a two or three-dimensional configuration. Each of the modules 12 preferably contains a plurality of transducers as described herein. The transducers are driven by a signal generator 14 by way of a phasing network 16. The network 16 applies variable relative phases to the signals applied to the transducers in order to facilitate electronic focusing, steering, or otherwise modifying the distribution of ultrasound radiated by the array 10. Alternatively, because the signal is wideband, it is possible to use delay—i.e., a constant relative phase shift across all frequencies—rather than variable phase shifting to steer the beam. In any case, network 16 can be omitted in applications where steering is not required.

The signal generator 14 includes an ultrasonic carrier generator 18, one or more audio sources $\mathbf{20}_1 \ldots \mathbf{20}_n$, whose outputs pass through optional signal conditioners 22 and a summing circuit 24. Signal conditioning can also be performed after summation. The composite audio signal from the circuit 24 is applied to an amplitude modulator 26 that modulates the carrier from the generator 18. The modulated carrier is applied to one or more driver circuits 27, whose outputs are applied to the transducers in the array 10. The modulator 26 is preferably adjustable in order to vary the modulation index.

As shown in FIG. 1, a portion of the signal from one or more of the sources 20 may, if desired, bypass the associated signal conditioner 22 by way of an attenuator 23. This unconditioned signal is summed by a summer 28 with the output of the conditioner 22 to provide an “enriched” sound in the demodulated ultrasonic beam.

The frequency of the carrier provided by the generator 18 is preferably of the order of 60 kHz or higher. Assuming that the audio sources 20 have a maximum frequency of approximately 20 kHz, the lowest frequency components of substantial intensity in accordance with the strength of the audio signal in the modulated signal transmitted by the array 10 will have a frequency of approximately 40 kHz or higher. This is well above the audible range of hearing of human beings and above the range in which, even though the energy is inaudible, the human hearing system responds and therefore can be damaged by high intensities. It is unlikely that relatively high acoustical intensities at frequencies well above the range of hearing will degrade the hearing capabilities of individuals subjected to the radiated energy.

Figure 2A:
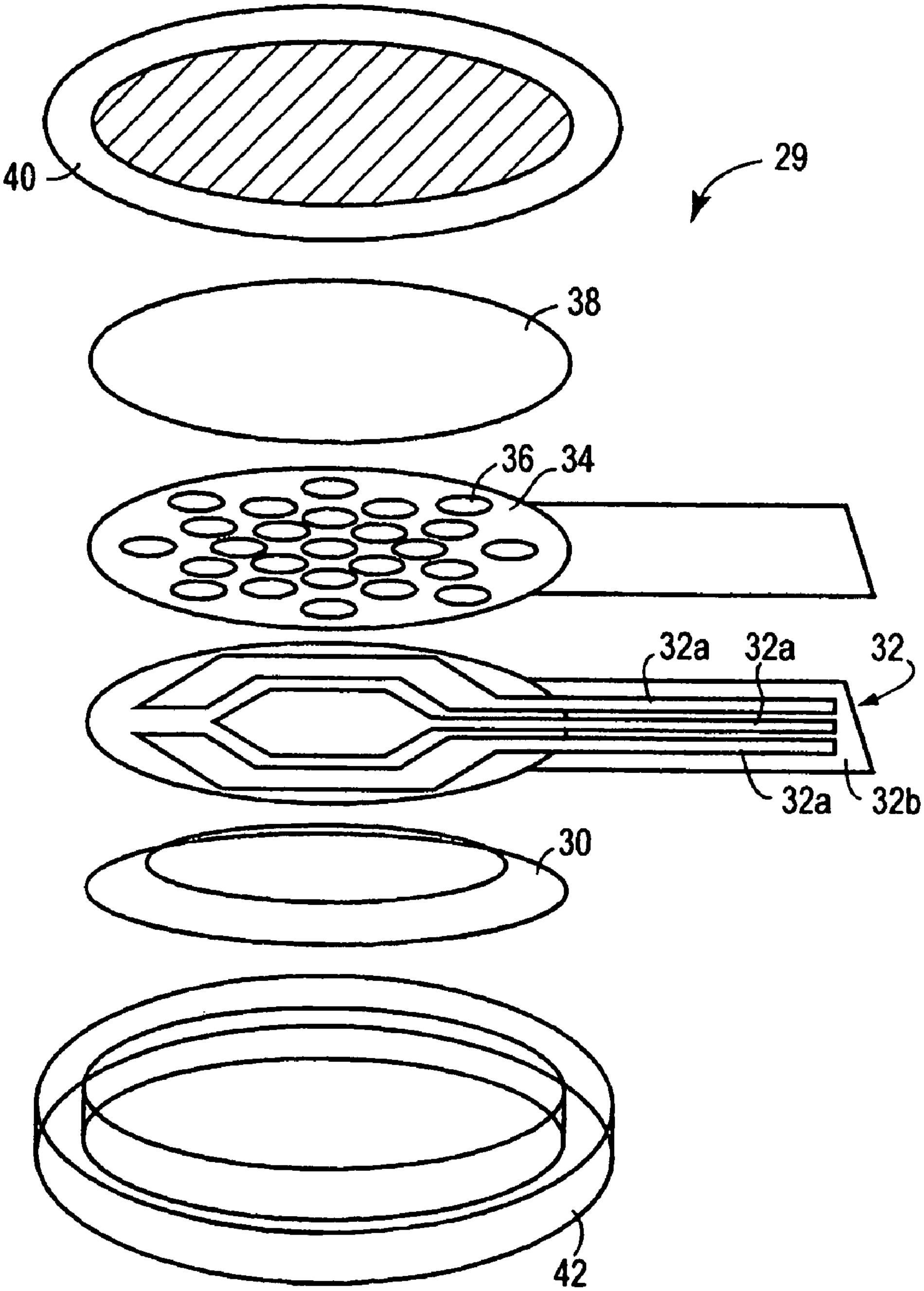
FIG. 2A is an exploded view of an electrostatic transducer module incorporating the invention.

As shown in FIG. 2A, an electrostatic transducer module 29 incorporating the invention may include a conical spring 30 that supports, in order, a conductive electrode unit 32, a dielectric spacer 34 provided with an array of apertures 36, and a metallized polymer membrane 38. The components 32-38 are compressed against the spring 30 by an upper ring 40 that bears against the film 38 and threadably engages a base member 42 that supports the spring 30. The module 29 comprises a plurality of electrostatic transducers, corresponding with the respective apertures 36 in the polymer spacer 34. Specifically, the portion of the film 38 above each of the apertures and the portion of the electrode unit 32 beneath the aperture function as a single transducer, having a resonance characteristic that is the function, inter alfa, of the tension and the area density of the film 38, the diameter of the aperture and the thickness of the polymer layer 34. A varying electric field between each portion of the membrane 38 and electrode unit 32 deflects that portion of the membrane toward or away from the electrode unit 32, the frequency of movement corresponding to the frequency of the applied field.

As illustrated the electrode unit 32 may be divided by suitable etching techniques into separate electrodes 32*a* below the respective apertures 36, with individual leads extending from these electrodes to one or more driver units 27 (FIG. 1).

The foregoing transducer configuration is easily manufactured using conventional flexible circuit materials and therefore has a low cost. Additionally, drive unit components can placed directly on the same substrate, e.g., the tab portion 32*b*. Moreover it is light in weight and can be flexible for easy deployment, focusing and/or steering of the array.

Figure 2B:
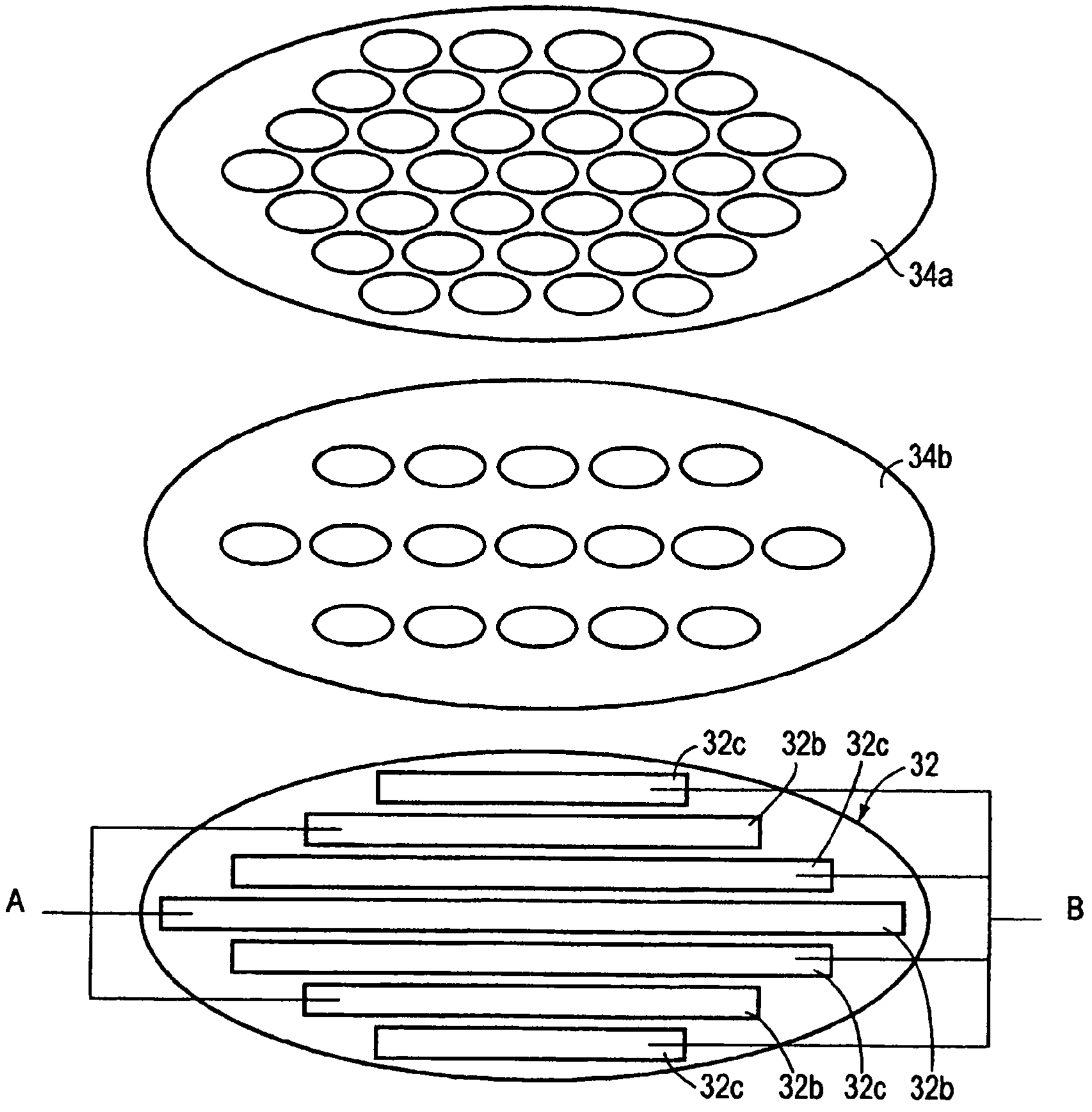
FIG. 2B depicts a modification of the transducer module of FIG. 2A, configured for multiple-resonant-frequency operation.

It will be appreciated that geometries, in particular the depths of the apertures 36, may vary so that the resonance characteristics of the individual transducers in the module 29 span a desired frequency range, thereby broadening the overall response of the module as compared with that of a single transducer or an array of transducers having a single acoustical-mechanical resonance frequency. This can be accomplished, as shown in FIG. 2B, by using a dielectric spacer 34 that comprises two (or more) layers 34*a* and 34*b*. The upper layer 34*a* has a full complement of apertures 36*a*. The lower layer 34*b*, on the other hand, has a set of apertures 36*b* that register with only selected ones of the apertures 36*a* in the layer 34*a*. Accordingly, where two apertures 36*a*, 36*b* register, the aperture depth is greater than that of an aperture in the layer 34*a* above an unapertured portion of the layer 34*b*. The electrode unit 32 has electrodes 32*b* beneath the apertures in the layer 34*b* and electrodes 32*c* beneath only the apertures in the layer 34*a*. This provides a first set of transducers having higher resonance frequencies (shallower apertures) and a second set having lower resonance frequencies (deeper apertures). Other processes, such as screen printing or etching, can also produce these geometries.

Figure 3A:
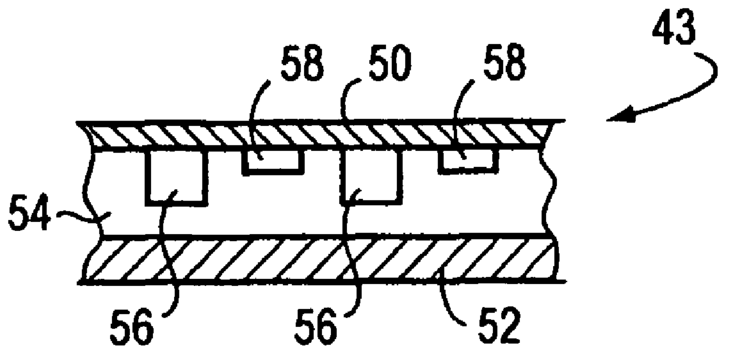
FIGS. 3A, 3B and 3C depict representative transducer modules.

FIG. 3A illustrates another transducer module 43 capable of relatively broad-band operation. The module has a generally cylindrical shape, the figure illustrating a radial segment thereof. As shown, an electrically conductive membrane 50 is spaced from a back plate electrode unit 52 by a dielectric spacer 54. The top surface 54*a* of the spacer is interrupted by annular groves 56 and 58. The module 43 includes suitable structure (not shown) forcing the membrane 50 against the top surface 54*a*. Thus the module comprises a plurality of transducers defined by the membrane 50 and the top edges of the grooves 56 and 58.

The grooves 56 are deeper than the grooves 58 and, therefore, the transducers including the grooves 56 have a lower resonance frequency that those incorporating the grooves 58. The resonance frequencies are spaced apart sufficiently to provide a desired overall response that corresponds to the bandwidth of the modulated ultrasonic carrier.

Figure 3D:
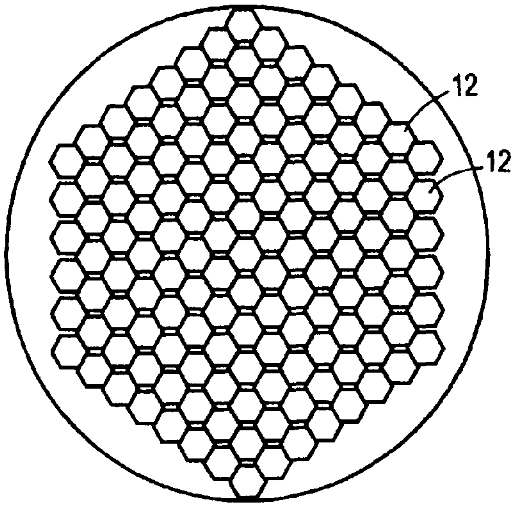
FIGS. 3D and 3E illustrate arrays of transducer modules.
Figure 3B:
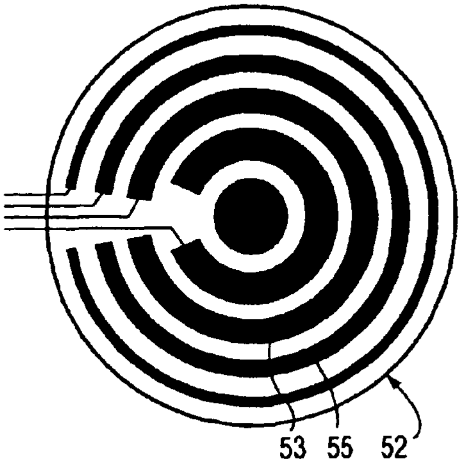
Figure 3E:
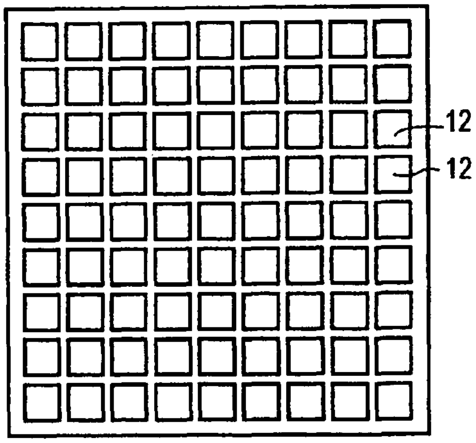
Figure 3C:
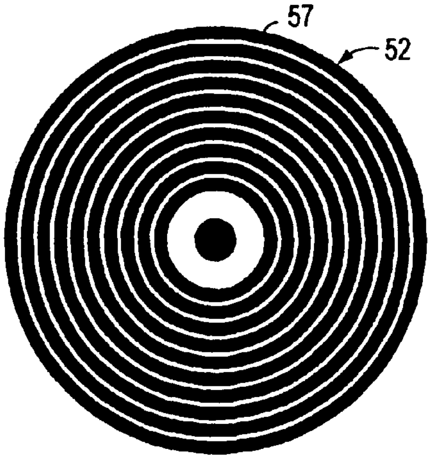

The back plate electrode unit 52 may be provided with a conductive pattern comprising rings 53, 55 and 57, as shown in FIGS. 3B and 3C so that the respective transducers can be individually driven as described herein. The spacings of the rings 53 and 55 and the relative phases of the applied signals can be selected so as to shape the ultrasonic beams projected from the transducer modules.

FIGS. 3D and 3E illustrate arrays of transducer modules in which the modules have alternative configurations. In FIG. 3D, each of the modules has a hexagonal horizontal outline, which provides close packing of the modules. In FIG. 3E the modules have a square configuration, which also permits close packing. The patterns are well-suited for multiple-beam generation and phased-array beam steering. It should be noted that, in all of the foregoing transducer embodiments, any electrical crosstalk among electrodes can be mitigated by placing so-called "guard tracks" between the power electrodes. It should also be appreciated that transducers having multiple electrical (but not necessarily acousto-mechanical) resonances can be employed to increase the efficiency of amplification over a wide bandwidth.

Figure 4:
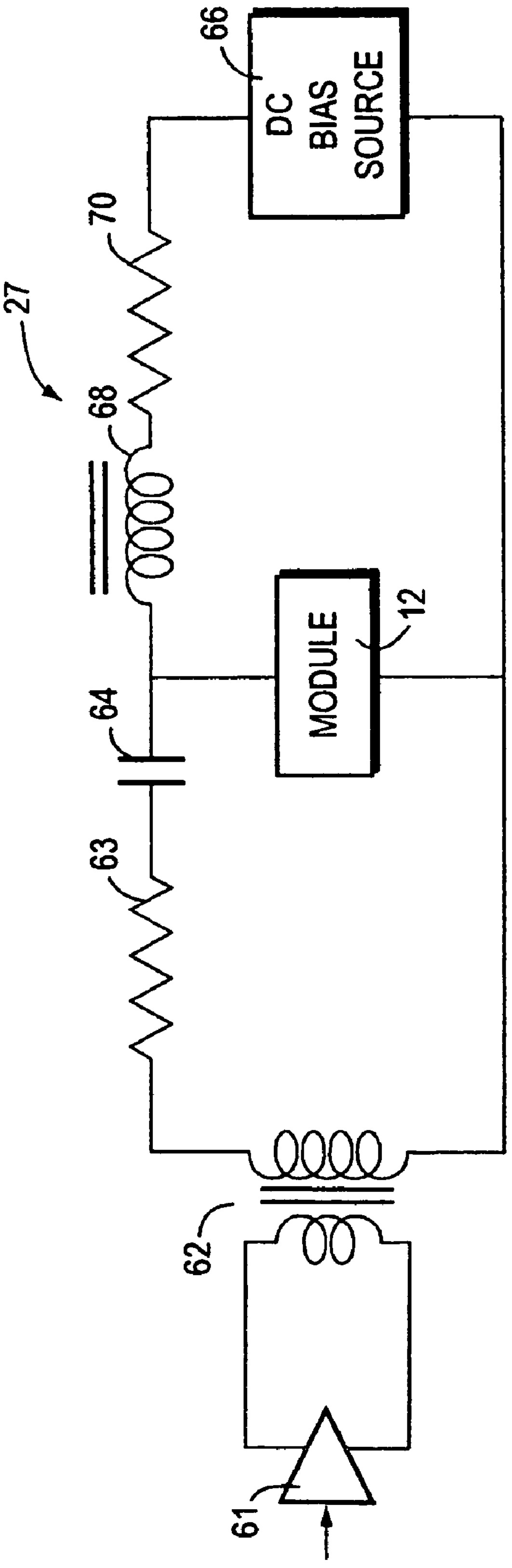
FIG. 4 is a circuit diagram of a drive unit that drives transducers in the sound system.

In FIG. 4 I have illustrated a drive unit 27 for efficiently driving a transducer module 12 or an array of modules. The drive unit includes an amplifier 61 whose output is applied to a step-up transformer 62. The secondary voltage of the transformer is applied to the series combination of one or more transducers in a module 12, a resistor 63 and a blocking capacitor 64. At the same time electrical bias is applied to the module from a bias source 66 by way of an isolating inductor 68 and resistor 70. The capacitor 64 has a very low impedance at the frequency of operation and the inductor 68 has a very high impedance. Accordingly, these components have no effect on the operation of the circuit except to isolate the AC and DC portions from each other. If desired, inductor 68 can be replaced with a very large resistor.

The secondary inductance of the transformer 62 is preferably tailored to resonate with the capacitance of the module 12 at the frequency of the acoustical-mechanical resonance frequency of the transducers driven by the units 27, i.e., 60 kHz or higher. This effectively steps up the voltage across the transducer and provides a highly efficient coupling of the power from the amplifier 27 to the module 12. The resistor 63 provides a measure of dampening to broaden the frequency response of the drive circuit.

It will be understood that one can use a transformer 62 with a very low secondary inductance and add an inductor in series with the transducer to provide the desired electrical resonant frequency. Also, if the transformer has an inductance that is too large to provide the desired resonance, one can reduce the effective inductances by connecting an inductor parallel with the secondary winding. However, by tailoring the secondary inductance of the transformer I have minimized the cost of the drive circuit as well as its physical size and weight.

Figure 5:
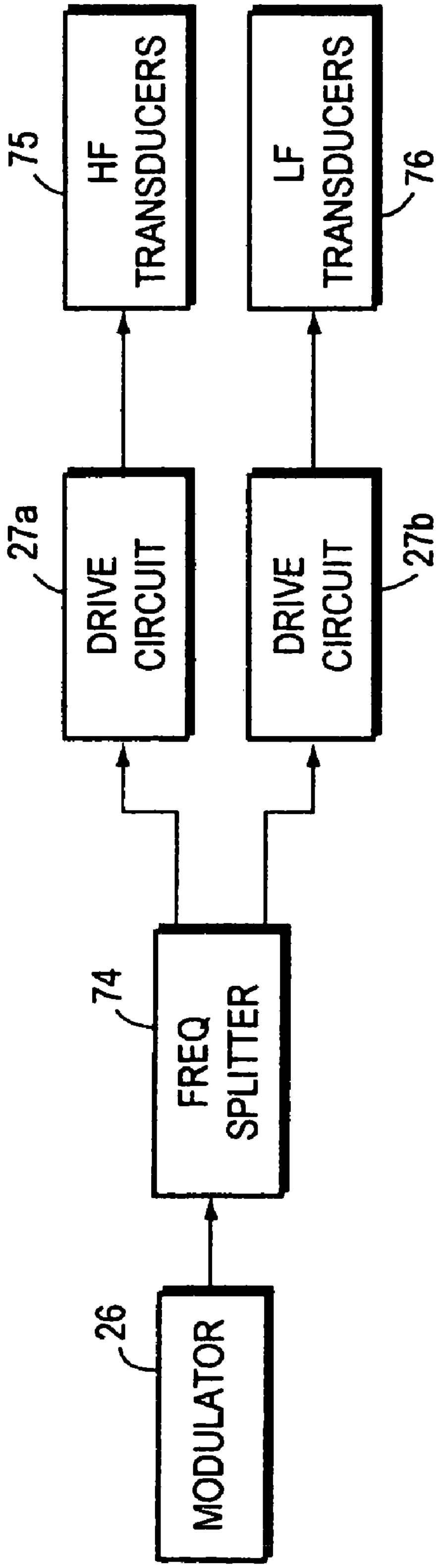
FIG. 5 is a diagram of a circuit used to drive transducers having different mechanical resonance frequencies.

When a transducer module or array includes transducers having different resonance frequencies as described above, it is preferable, though not necessary to use separate drive circuits tuned to the respective resonance frequencies. Such an arrangement is illustrated in FIG. 5. The output of the modulator 26 is applied to a frequency splitter 74, which splits the modulated ultrasonic signal into upper and lower frequency bands corresponding to the resonance frequencies of high-frequency transducers 75 and low frequency transducers 76, respectively. The upper frequency band is passed through a drive circuit 27*a* tuned to the mechanical resonance frequency of the transducers 75 and the resonant frequency of the drive circuit 27*b* corresponds with the mechanical resonance of the low frequency transducers 76.

The spacers 34 (FIG. 2A) and 54 (FIG. 3A), can be metallic spacers suitably insulated from the conducting surface of the membranes 38 and 50 and/or the conductors on the electrode units 32 and 52. However, dielectric spaces are preferred, since they permit the use of higher voltages and thus more powerful and linear operation of the transducers.

Figure 6A:
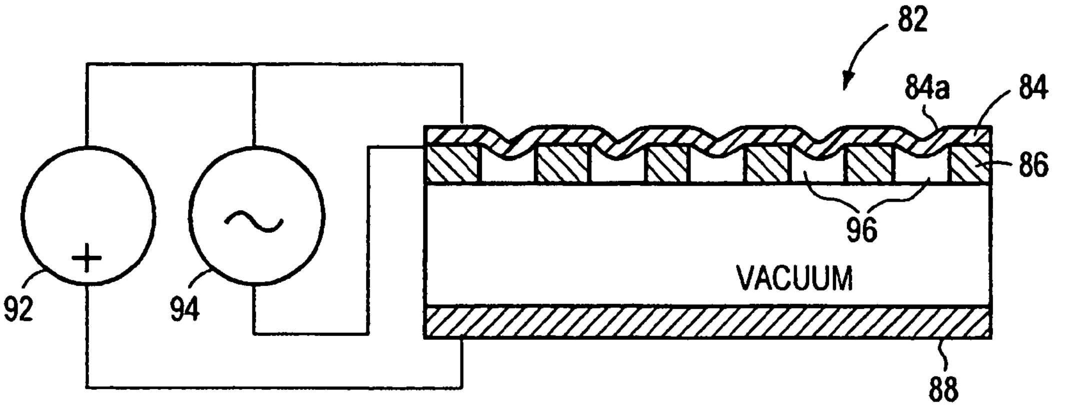
FIGS. 6A and 6B illustrate transducer modules employing piezoelectric membrane transducers.

In FIG. 6A I have illustrated of transducer module 90, incorporating piezo-active membranes (e.g., polyvinylidene fluoride (PVDF) films that are inherently piezoelectric). Metallic film on opposite surfaces are used to apply alternating electric fields to the piezoelectric material and thus cause it to expand and contract. The PVDF films have previously been used in sonic transducers, most efficiently by operating the piezoelectric material in the transverse mode. Specifically, the membrane is suspended on a support structure containing multiple cavities. In accordance with known approaches, a vacuum is applied to the cavities to provide a biasing displacement of the membrane into the cavities. The alternating voltage applied to the membrane causes the membranes to expand and contract transversely to the applied field, causing the membrane to move back and forth against the vacuum bias.

I have found these PVDF transducer modules to be highly suitable for parametric sound generation. However, a shortcoming of the prior PVDF transducer modules is the necessity of maintaining a vacuum, which may be unreliable in the long run.

The transducer module 82 in FIG. 6A employs an electric field to bias the transducers. A PVDF membrane 84 is suitably attached to a perforated top plate 86 and spaced above a conductive bottom electrode 88. A DC bias, provided by a circuit 92, is connected between the electrode 88 and a conductive surface 84*a* of the membrane, thereby urging the membrane into the apertures 96 in the plate 86. This provides a reliable mechanical bias for the membrane 84 so that it can function linearly to generate acoustical signals in response to the electrical outputs of the drive circuit 94. As described above in connection with FIG. 4, DC bias circuit 92 can include components that isolate it from the AC drive circuit 94.

For use in a parametric sound generator provided with broadband operation, as described above, the apertures 96 have different diameters, as shown, to provide different resonant frequencies for the individual transducers, which comprise the portions of the membrane 84 spanning the apertures. One of the conductive surfaces on the membrane is patterned to provide electrodes that correspond with the apertures. The same surface is also provided with conductive paths that connect these electrodes to the circuits 92 and 94. Specifically, the electrodes can be patterned, as described for the electrostatic transducers of FIGS. 2 and 3, in order to control the geometry and extent of the beam (for phasing, steering, absorption compensation, and resonant electrical driving and reception, etc.) and to facilitate driving at multiple resonances.

The module depicted in FIG. 6A is highly reliable, yet it provides all the advantages of PVDF transducers. Moreover, it is readily adaptable, as shown for multiple-resonant-frequency operation.

Figure 6B:
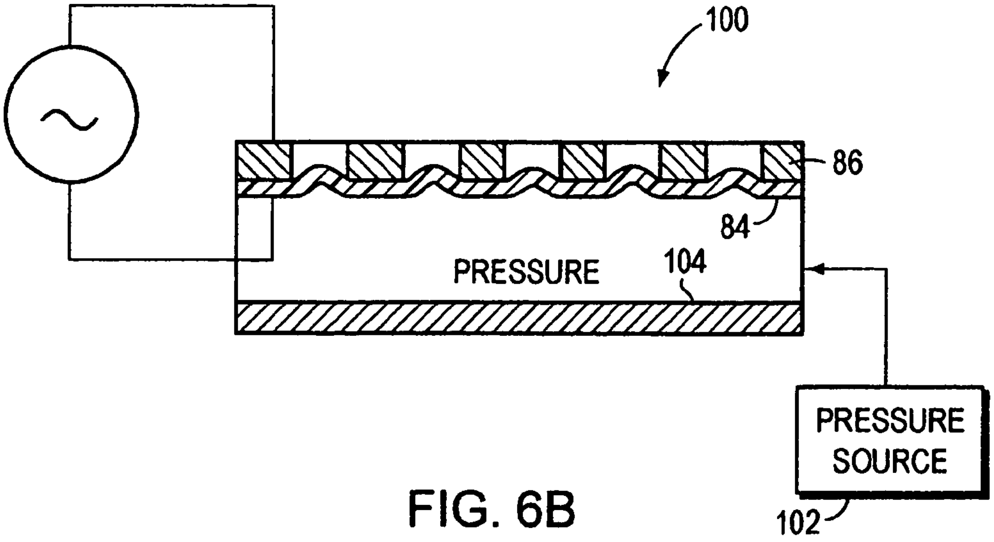

In FIG. 6B I have illustrated a PVDF transducer module 100, which is biased by means of a positive pressure source 102 connected to the cavity between the membrane 84 and a back plate 104, which may be of conductive or dielectric material. It uses the same electrical drive arrangement as the module 82 of FIG. 6A, except for the omission of DC biases. Ordinarily, it is more feasible to provide a reliable positive rather than negative pressure in a PVDF module. Alternatively, a positive or negative bias can be provided by employing a light but springlike polymer gel or other material between the membrane and the backplate.

Atmospheric demodulation of a parametric audio signal substantially boosts the high-frequency audio components, with a resulting amplitude response of about 12 dB/octave. This characteristic has been compensated by a corresponding use of a low-frequency emphasis filter for de-emphasis of the audio signal prior to preprocessing. However, I prefer to provide compensation by using transducers that have an appropriate frequency response. Specifically, rather than providing a transducer response that is essentially flat over the frequency range of the transmitted signals, I prefer to provide the transducers with an essentially triangular response centered on the carrier frequency, assuming double-sideband modulation. The transducer modules described above provide this response when configured for multiple-resonant-frequency operation as depicted. A re-emphasis filter may be used to correct for the non-uniform transducer response.

Figure 7:
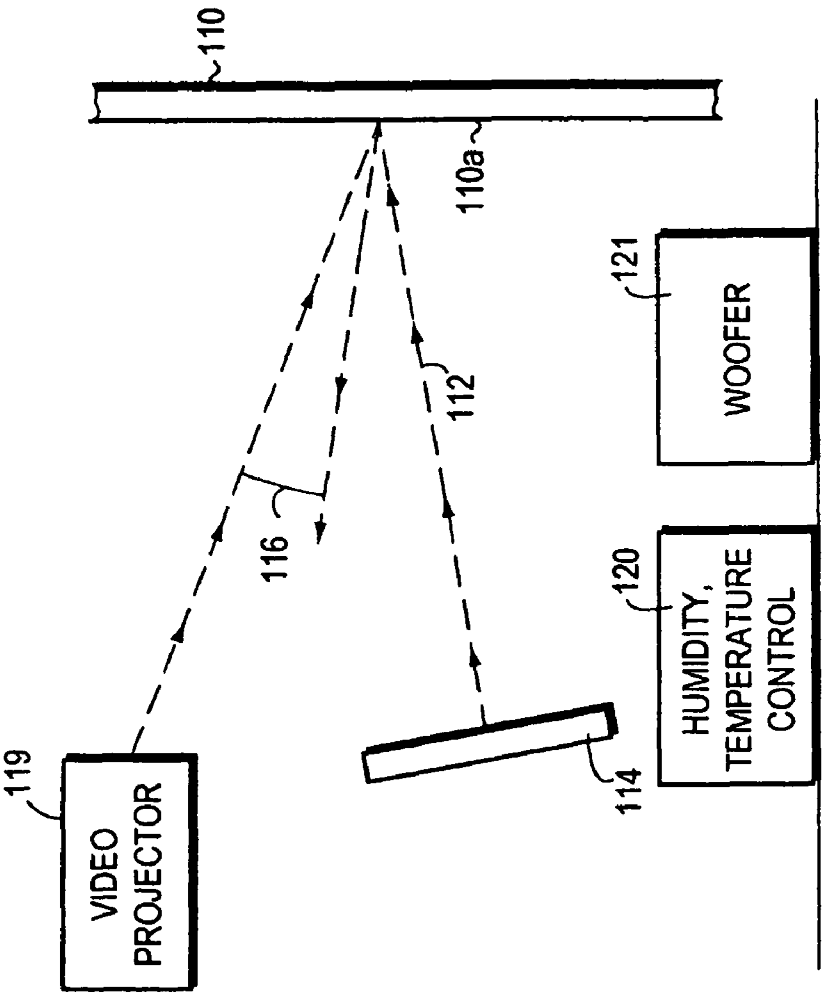
FIG. 7 illustrates the use of the system in reflecting sound from a wall.

FIG. 7 illustrates the use of a parametric sound generator in connection with a wall 110 against which the beam 112 from a transducer array 114 is projected. The wall may have a surface 110*a* that is relatively smooth and thus provides specular reflection at both the ultrasonic and audio frequencies. In that case the projected beam 112 is reflected, along with the sonic content of the beam, as indicated at 116.

Alternatively, the front surface 110*a* of the wall may be of a material or structure that absorbs ultrasonic energy and reflects audio energy. In that case, there will be no reflected beam. Rather there will be a relatively non-directional source of audio signals from the area in which the beam 112 strikes the wall. Accordingly, if at the same time a moving visual image is projected against the wall by a projector 119, the beam 112 may be made to track the image so that the sound always appears to emanate from the image. The same effect may be provided by using a surface that has irregularities that diffusely reflect the ultrasonic energy. In either case the projected beam can have relatively high ultrasonic energy levels, which results in more audible energy, without causing reflections having a dangerously high ultrasonic intensity. The beam 112 and projector 119 may be coupled for common steering by servomechanism (not shown) or by the use of a common reflective plate (not shown) to provide the desired image tracking; alternatively, the beam may be steered using a phased array of transducers. The wall may also be curved as to direct all audible reflections to a specific listening area.

In still another alternative, the wall 110 may reflect light but be transparent to sound, allowing the sound to pass through wall 110 (to be reflected, for example, from a different surface). The important point is that the sonic and light-reflecting properties of wall 110 may be entirely independent, affording the designer full control over these parameters in accordance with desired applications.

The system depicted in FIG. 7 may also include equipment for controlling atmospheric conditions such as temperature and/or humidity; I have found that the efficiency of demodulation of beam energy to provide audible signals is a direct function of such conditions. A device 120, which may be, for example, a thermostatically controlled heater, a moisture generator and/or a dehumidifier, maintains the desired condition along the path traversed by the ultrasonic beam 84. For example, in cases where the atmosphere would otherwise have a low relative humidity, it will often be desirable to inject moisture into the atmosphere; in general, it is desirable to avoid relative humidities on the order of 20-40%, where absorption is maximum. Other agents, such as stage smoke, may also be injected into the atmosphere to increase the efficiency of demodulation.

In order to provide deep bass content in the audio signals, the outputs of the audio sources 20 (FIG. 1) may be applied to a woofer (i.e., a low-frequency speaker) 121. Inasmuch as the very low frequencies do not contribute to the directional effect of audio signals, the use of the woofer 121 ordinarily does not detract from the apparent movement of the sound source across the wall 110. Of course, woofer 121 should be positioned and/or controlled to avoid any perceptible adverse impact on the intended projection effect.

By using two or more ultrasonic beams one may position the apparent source of an audio signal as desired within a three-dimensional space. One or both of the beams are modulated with the audio signal. The individual modulated beams have an intensity below the level at which a significant audio intensity is produced. The beams are directed to intersect each other, and in the volume in which the beams intersect, the combined intensity of the two beams is sufficient to provide a substantial audio signal. In this connection one should note that the strength of a demodulated audio signal is proportional to the square of the intensity of the projected ultrasonic beam. The audio signal thus appears to emanate from that volume and one may therefore move the apparent audio source throughout a three-dimensional space by shifting the intersection of the beams. Indeed, by controlling the interference of two or more beams, it is possible to change the size, shape, and extent of the sound source.

Figure 8:
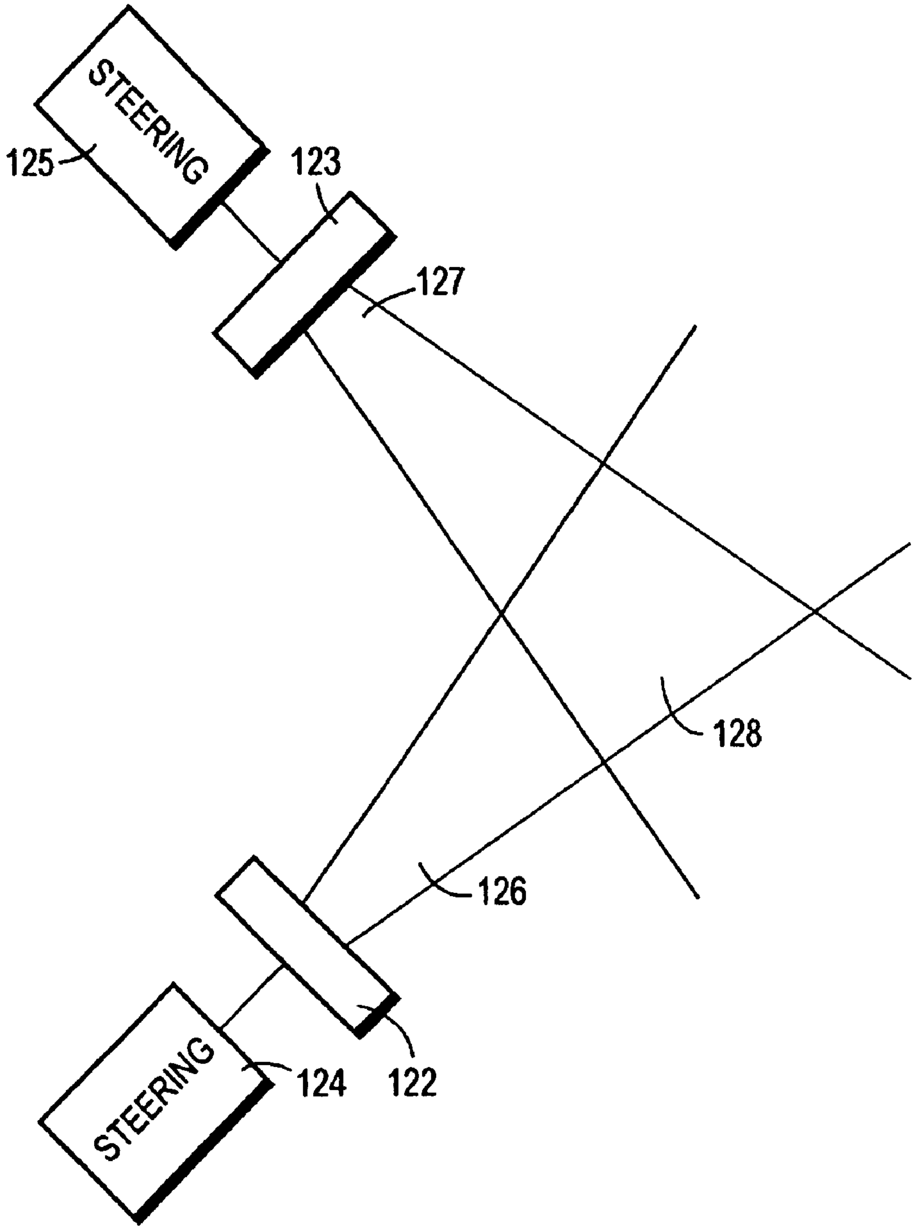
FIG. 8 illustrates the use of multiple beam projectors used to move opponent sound sources in three-dimensional space.

A parametric generator providing this function is illustrated in FIG. 8. A pair of ultrasonic transducer arrays 122 and 123, that operate as described above, are supported by steering mechanisms 124 and 125 that provide independent steering of the beams 126 and 127 projected by the arrays 122 and 123. The beams intersect in a volume 128 which is the apparent source of an audible signal resulting from non-linear interaction of the ultrasonic energy within the volume. The steering mechanisms are controlled by a controller (not shown) to steer the beams 126 and 127 and thereby move the beam interaction volume 128 to various desired locations. This approach is useful not only to create an apparent source of sound, but also to confine the audio signal to a specific region or to a specific audience (which may be moving) without disturbing others. In such "directed audio" applications, it can prove useful to employ absorbing surfaces to reduce unwanted audio reflections in the vicinity of the directed beams.

Beams 126, 127 (generated as separate beams or as a split beam) can also each be directed to one of the listener's ears to produce stereophonic or binaural audio. In this case, each of the beams 126, 127 is modulated with a separate stereo or binaural channel; in the latter case, maintaining the binaural illusion may require awareness of the position of the listener in creating the audio signals.

When a low-level audio signal is to be reproduced, it is undesirable to simply allow the modulation depth to remain small, while maintaining a high-energy ultrasound beam, as in prior systems. Instead, it is preferred to maintain a modulation depth near unity by adapting the amplitude of the carrier in response to changes in the audio signal level. This assures maximum efficiency of the system, and automatically inhibits the transmission of ultrasound when the incoming audio is absent.

Figure 9:
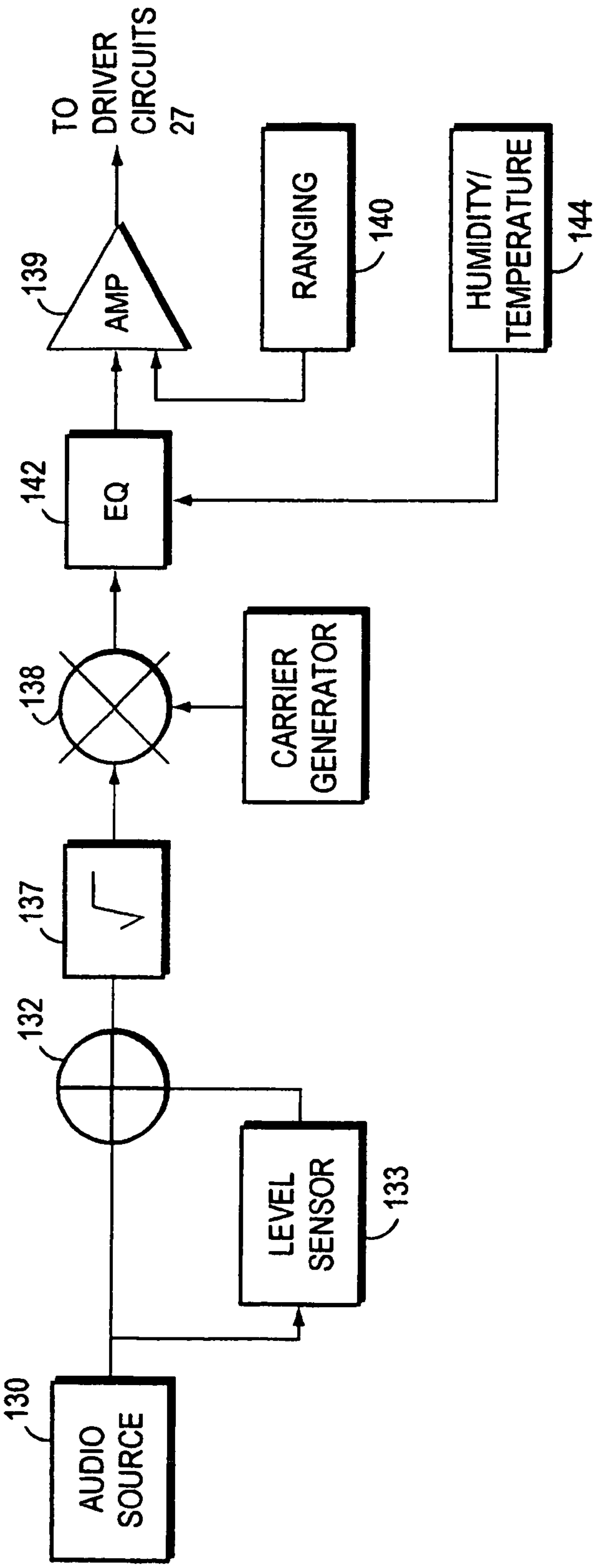
FIG. 9 illustrates an adaptive modulation arrangement for a parametric sound generator.

A suitable adaptive system is depicted in FIG. 9. An audio input is provided by a source 130, which may also include de-emphasis, depending on the transducer characteristics as described above. The output of the source 130 is applied to a peak-level sensor 133 and to a summer 132, which also receives the output of the sensor 133.

The output of the summer 132 is applied to a square-root circuit 137 and the resulting audio signal multiplies the carrier in a modulator-multiplier 138. The modulated carrier may be amplified by an amplifier 139 before passing to a transducer driver circuit. Some or all of the functions of the circuit elements in FIG. 9 may, of course, be accomplished by means of one or more suitably programmed digital signal processors and associated circuitry.

More specifically, a parametric system creates an audible secondary beam of sound by transmitting into the air a modulated, inaudible, primary ultrasonic beam. For a primary beam described by:

$$p_1(t)=P_1E(t)\sin(\omega_c t) \tag{1}$$

where $P_1$ is the carrier amplitude and $\omega_c$ is the carrier frequency, a reasonably faithful reproduction of an audio signal g(t) can be obtained when:

$$E(t)=(1+\iint mg(t)dt^2)^{1/2} \tag{2}$$

where m is the modulation depth, with g(t) normalized to a peak value of unity. The resulting audible beam $p_2(t)$ is then known to be:

$$\begin{aligned} p_2(t) &\propto P_1^2\frac{d^2}{dt^2}E^2(t) \\ &\propto P_1^2\text{mg}(t) \\ &\propto g(t) \end{aligned} \tag{3}$$

When there is no audio signal (g(t)=0), E(t)=1, the primary beam $p_1(t)=P_1\sin(\omega_c t)$ continues with transmission of the ultrasonic carrier. This silent ultrasound beam serves no purpose, and wastes energy. It may also be a hazard: a pure-tone sound is generally, at least for audible sound, more dangerous than a wideband sound (with energy spread throughout), and as there is nothing audible, listeners are not aware that they are being subjected to energetic ultrasound.

The circuit of FIG. 9 controls both the modulation depth and overall primary amplitude $P_1$, thereby to (a) maximize the modulation depth (while keeping it at or below some target, usually 1); (b) maintain an audible level corresponding to the level of the audio signal g(t) by adjusting $P_1$ appropriately; and (c) ensure that when there is no audio, there is little or no ultrasound. These functions are accomplished by measuring the peak level, L(t), of the integrated (i.e., equalized) audio signal and synthesizing the transmitted primary beam p'(t) as $$p'(t)=P_1(L(t)+m\iint g(t)dt^2)^{1/2}\sin(\omega_c t) \tag{4}$$

where L(t) is the output of the level sensor 133 and the quantity $L(t)+m\iint g(t)dt^2$ is the output of the summer 132. The square root of the latter quantity is provided by the square root circuit 137, and the final multiplication by $P_1\sin(\omega_c t)$ is provided by the multiplier 138.

The output, p'(t), of the multiplier 138, as defined by formula (4), can also be provided by means of a conventional amplitude modulator, with both $P_1$ and the level of the audio signal applied to the modulator being controlled according to the peak level of g(t). To obtain a demodulated audio signal whose level is proportional to that of g(t), the level-control signal would be proportional to the square-root of the value of peak g(t). The preferred embodiment of the invention, depicted in FIG. 9, provides a simple, more direct mechanism to accomplish this result. In this connection, it should be noted that the square-root circuit 137 provides the dual functions of preconditioning the audio signal for reduction of intermodulation distortion and providing the square-root of L(t).

Atmospheric demodulation of the ultrasonic signal results in an audio signal $p'_2(t)$ given by $$\begin{aligned} p'_2(t) &\propto \frac{d^2}{dt^2}E^2(t) \\ &\propto \frac{d^2}{dt^2}\left(L(t)+m\int\int g(t)dt^2\right) \\ &\propto \frac{d^2L(t)}{dt^2}+\text{mg}(t) \end{aligned} \tag{5}$$

This signal thus includes the desired audio signal mg(t) and a residual term involving the peak-detection signal L(t). The audible effect of the residual term can be reduced to negligible proportions by applying a relatively long time constant to L(t) and thereby materially reducing the second derivative in formula (5) This, however, will result in overmodulation, and resulting unacceptable distortion, when the audio signal level suddenly increases. Accordingly, the peak level detector is provided with an essentially zero time constant for increases in g(t) peak and a slow decay (long time constant) for decreases in g(t) peak. This reduces the audible distortion from the first term of formula (5) and shifts it to very low frequencies. At the same time it provides a carrier level no greater than that required to transmit a modulated beam with a desired modulation depth m.

When there are established safety measures regarding ultrasound exposure, the control system of FIG. 9 can be augmented to automatically eliminate the possibility of exceeding allowable exposure. For example, if different members of the audience are at different distances from the transducer, the output power level must be adjusted to provide the closest listener with a safe environment. In such situations, it can be useful to determine the distance between the transducer and the closest audience member, and use this distance to control the maximum allowed ultrasound output so that no listener is subjected to unsafe exposure. This may be achieved with a ranging unit 140, which determines the distance to the nearest listener and adjusts the output (e.g., through control of amplifier 139) accordingly.

Ranging unit 140 can operate in any number of suitable ways. For example, unit 140 may be an ultrasonic ranging system, in which case the modulated ultrasound output is augmented with a ranging pulse; unit 140 detects return of the pulse and, by measuring the time between transmission and return, estimates the distance to the nearest object. Alternatively, rather than sending out a pulse, correlation ranging may be used to monitor the reflections of the transmitted ultrasound from objects in its path, and the echo time estimated by cross-correlation or cepstral analysis. Finally, it is possible to utilize infrared ranging systems, which have the advantage of being able to discriminate between warm people and cool inanimate objects.

It is also possible to compensate for distortion due to atmospheric propagation. The absorption of sound in air is highly dependent on frequency (approximately proportional to its square). While the carrier frequency employed herein is preferably centered near 65 kHz to minimize absorption, the signal is nonetheless wideband ultrasound spanning a range of frequencies that are absorbed to varying extents. Higher ultrasonic frequencies are absorbed more strongly than the lower frequencies, resulting in audible distortion in the demodulated signal. This effect can be mitigated by selectively boosting the ultrasonic output in a frequency-dependent manner that compensates for the nonuniform absorption.

Figure 10A:
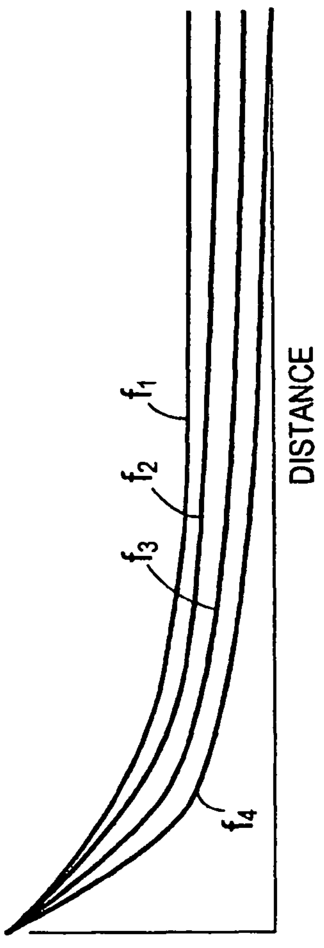
FIGS. 10A and 10B show, respectively, the frequency-dependent decay of ultrasonic signals through the atmosphere and the result of correcting for this phenomenon.

As described in Bass et al., *J. Acoust. Soc.* 97(1):680-683 (January 1995), atmospheric absorption of sound depends not only on frequency but also on the temperature and humidity of the air; moreover, the overall amount of decay is also affected by on the propagation distance (almost, but not quite, leveling out at far distances). Accordingly, precise compensation would require sensing and adjusting for these parameters. But satisfactory results can be obtained by making assumptions of average conditions (or measuring the average conditions for a particular environment) and basing a compensation profile on these. Thus, as illustrated in FIG. 10A, the absorption (in terms of attenuation in dB) of four different frequencies of ultrasound differs perceptibly, with the highest frequency $f_4$ being absorbed most strongly (and therefore decaying most rapidly). The present invention creates an acoustic field that compensates for this frequency-based nonuniformity.

Figure 10B:
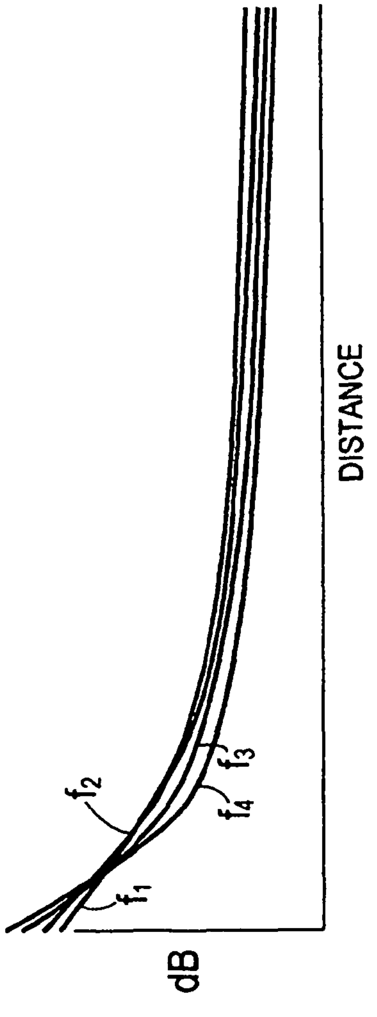

In a preferred approach, the modulated signal is passed through an equalizer 142, which adjusts the signal amplitude in proportion to the expected amount of decay, e.g., at an assumed or actual distance. As a result, the curves shown in FIG. 10A are brought closer together as illustrated in FIG. 10B (with the greatest power boost applied to the highest frequency $f_4$); while the overall rate of decay is not altered, it is not nearly as frequency-dependent (and therefore audibly distortive). Of course, compensation may also be introduced for the absolute amount of decay using ranging unit 140, since with frequency dependence largely corrected, decay is based primarily on the distance to the listener.

The correction applied by equalizer 142 may be further refined through the use of a humidity and temperature sensor 144, the output of which is fed to equalizer 142 and used to establish the equalization profile in accordance with the known atmospheric absorption equations.

Equalization correction is useful over a wide range of distances, i.e., until the curves diverge once again. In such circumstances, it is possible to improve correction—albeit at the cost of system complexity—using beam geometry, phased-array focusing, or other technique to actually change the amplitude distribution along the length of the beam in order to compensate more precisely for absorption-related decay.

Figure 11:
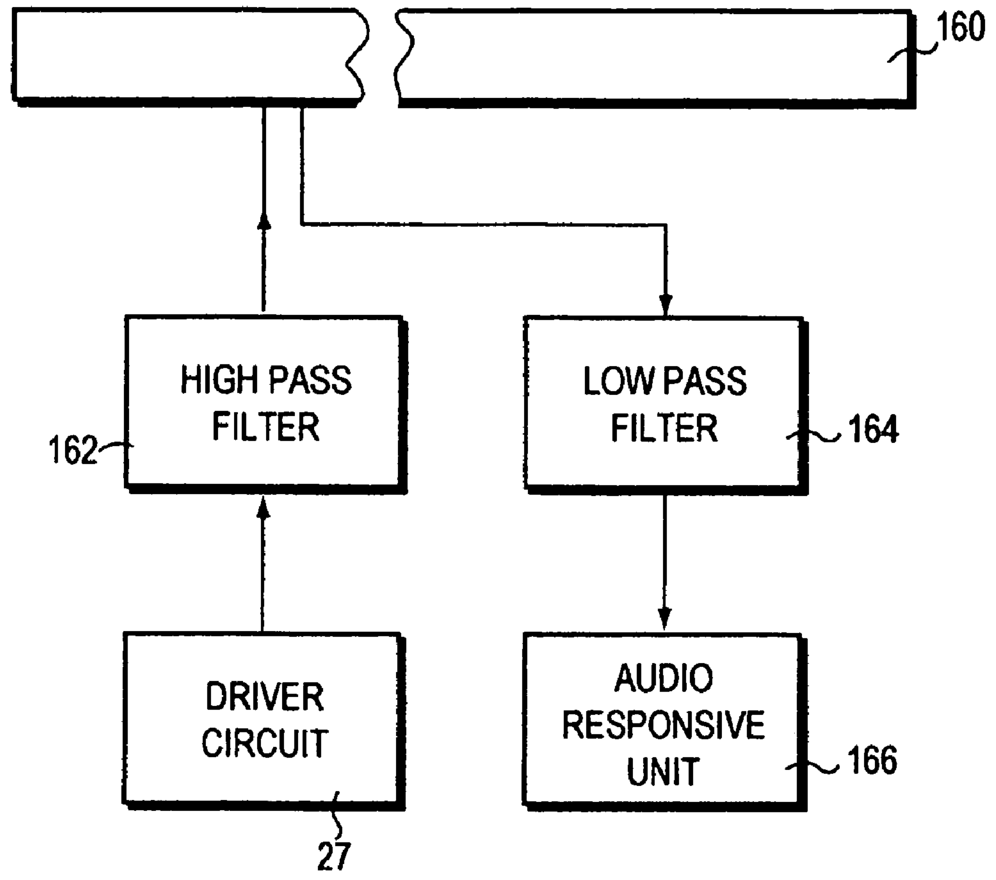
FIG. 11 illustrates the use of a transducer area for both transmission of parametric audio signals and reception of audio signals.

It should be noted that the ultrasonic transducers described earlier can be used for the reception of audible or ultrasonic signals in addition to their transmission. As shown in FIG. 11, a transducer module or array 160 is powered, as described above, from one or more driver circuits 27. A high-pass filter 162, connected between each driver circuit 27 and the array 160 prevents dissipation of received audio energy in the driver circuits. A low-pass filter 164 passes audio energy from the array 160 to an audio-responsive unit 166 such as an amplifier and loudspeaker.

Assuming linear operation of the transducers in the array, the audio signals will suffer insubstantial distortion. Alternatively, a multiple-frequency arrangement with multiple electrodes, such as described above, can be used, with transducers that respond in the audio range being used for audio reception without the need for filtering. This allows full-duplex transduction on the same surface, which is difficult with traditional transducers, as well as phased-array reception, providing both a directional transmitter and receiver system.

Although the foregoing discussion highlighted various specific applications of the invention, these are illustrative only. The invention is amenable to a wide variety of implementations for many different purposes. Additional applications include, but are not limited to, creation of entertainment environments (e.g., the use of projected audio to cause the sounds of various musical instruments to appear in specific and changing places about a room, such as locations where visual images of the instruments are projected; or to direct sound to particular audience members; or to give an audience control over the apparent source of sound in interactive sequences; or to provide exact sound placement from home entertainment systems, e.g., in response to cues encoded in recordings and specifying sound pans and/or placement directions; or to steer the beam low to reach children but not their parents); store displays (e.g., directing sound at a displayed item); trade show promotions (e.g., to guide participants through the show or to different booths); military and paramilitary applications (e.g., phantom troops or vehicles to confuse the enemy; directed messages to enemy troops or populations; highly directed bullhorns for police to target alerts to suspects without alarming bystanders); office applications (e.g., to confine sound to particular work cubicles); address systems in public places (e.g., paging systems for arenas where listener locations are known, so that the parametric beam may be directed solely to the occupant of a particular seat without disturbing nearby audience members; or to particular tables in restaurants; or to deliver announcements or warnings in public places, e.g., to pedestrians about to dismount escalators or approaching dangerous areas; or to help direct blind persons; or, with the transducer configured as a ring surrounding a spotlight, following the light beam so sound emanates from an illuminated object); toys (e.g., devices that emanate highly directed whispers or noises such as smashing glass or gunfire); repelling animals; applications whereby sound is projected onto a surface some distance away from an apparent source in order to maintain synchronization between the sound and images; and personal audio sources (e.g., to create individual listening on airplanes, replacing headphones).

It will therefore be seen that I have developed a highly versatile and efficient system for delivering audio via modulated ultrasonic radiation. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A parametric audio generator comprising:

(a) an ultrasonic signal source providing an ultrasonic carrier;

(b) first and second ultrasonic transducers, said first transducer having a first acoustical-mechanical resonance and said second transducer having a second acoustical-mechanical resonance at a frequency higher than that of said first transducer;

(c) a source of audio signals;

(d) means for modulating said carrier with the audio signals to form a modulated carrier, whereby the frequency spectrum of the modulated carrier includes both of said transducer resonances;

(e) means for driving said transducer with the modulated carrier;

(f) means for splitting the modulated carrier into upper and lower frequency-range signals;

(g) means for driving said first transducer with said lower frequency range signal; and (h) means for driving said second transducer with said upper frequency range signal.

2. The audio generator of claim 1 wherein:

(a) each of said transducers has an electrically capacitive element to which the signal for that transducer is applied; and (b) each of said driving means for driving includes an inductor conducted to resonate with the capacitive element of the transducer driven by the driving means to provide an electrical resonance corresponding with the acoustical-mechanical resonance of the transducer.

3. A parametric audio generator comprising:

(a) a carrier generator providing an electrical carrier and an ultrasonic frequency and having an amplitude sin($\omega_c$t);

(b) a modulator for modulating the carrier with an input audio signal (1+∬g(t)dt);

(c) a transducer for receiving the modulated carrier and, in response thereto, transmitting a modulated acoustical beam;

(d) a source of input audio signals;

(e) an ultrasonic transducer for radiating ultrasonic signals;

(f) a level sensor for providing a level signal, L(t), corresponding to the level of the input audio signals;

(f) control means responsive to the input audio signals and the level signal for modulating the electrical carrier to provide a modulated signal, p'(t), of the form $$p'(t) = P_1\left(L(t) \times \left(1 + \frac{m}{L(t)}\int\int g(t)dt^2\right)\right)^{\frac{1}{2}} \sin(\omega_c t),$$

wherein m/L(t) is a modulation depth;

(g) means for summing the level signal, L(t), with the input audio signals to provide a sum signal;

(h) means for deriving the square root of the sum signal to provide a square root signal; and (i) means for multiplying the electrical carrier by the square root to provide the modulated carrier.

4. A parametric audio generator comprising:

(a) a carrier generator providing an electrical carrier and an ultrasonic frequency and having an amplitude sin($\omega_c$t);

(b) a modulator for modulating the carrier with an input audio signal (1+∬g(t)dt);

(c) a transducer for receiving the modulated carrier and, in response thereto, transmitting a modulated acoustical beam;

(d) a source of input audio signals;

(e) an ultrasonic transducer for radiating ultrasonic signals;

(f) a level sensor for providing a level signal, L(t), corresponding to the level of the input audio signals;

(f) control means responsive to the input audio signals and the level signal for modulating the electrical carrier to provide a modulated signal, p'(t), of the form $$p'(t) = P_1\left(L(t) \times \left(1 + \frac{m}{L(t)}\int\int g(t)dt^2\right)\right)^{\frac{1}{2}} \sin(\omega_c t),$$

wherein the level sensor has an essentially zero time constant for increases in g(t) peak and a long time constant for decreases in g(t) peak.

5. A parametric audio generator comprising:

(a) an ultrasonic signal source providing a carrier;

(b) an audio signal source providing an audio signal;

(c) a modulator that responds to the carrier and the audio signal to form a modulated carrier having a modulation depth and overall primary amplitude;

(d) an ultrasonic transducer that responds to the modulated carrier and radiates a modulated inaudible, primary ultrasonic beam into a propagation medium for subsequent demodulation of the radiated beam within the propagation medium to create an audible beam; and (e-1) a level sensor that senses the level of the audio signal;

(e-2) the modulation depth of the modulated carrier and overall primary amplitude of the modulated carrier being controlled in response to the sensed level of the audio signal to (i) keep the modulation depth at or below a target value;

(ii) maintain an audible level of the audible beam corresponding to the level of the audio signal; and (iii) ensure that when there is no audio signal, there is little or no ultrasound output from the ultrasonic transducer;

wherein the modulation depth is maximized while being kept at or below a target value.

6. A parametric audio generator comprising:

(a) an ultrasonic signal source providing a carrier;

(b) an audio signal source providing an audio signal;

(c) a modulator that responds to the carrier and the audio signal to form a modulated carrier having a modulation depth and overall primary amplitude;

(d) an ultrasonic transducer that responds to the modulated carrier and radiates a modulated inaudible, primary ultrasonic beam into a propagation medium for subsequent demodulation of the radiated beam within the propagation medium to create an audible beam; and (e-1) a level sensor that senses the level of the audio signal;

(e-2) the modulation depth of the modulated carrier and overall primary amplitude of the modulated carrier being controlled in response to the sensed level of the audio signal to (i) keep the modulation depth at or below a target value;

(ii) maintain an audible level of the audible beam corresponding to the level of the audio signal; and (iii) ensure that when there is no audio signal, there is little or no ultrasound output from the ultrasonic transducer;

wherein the target value is one.

7. A parametric audio generator comprising:

(a) an ultrasonic signal source providing a carrier;

(b) an audio signal source providing an audio signal;

(c) a modulator that responds to the carrier and the audio signal to form a modulated carrier having a modulation depth and overall primary amplitude;

(d) an ultrasonic transducer that responds to the modulated carrier and radiates a modulated inaudible, primary ultrasonic beam into a propagation medium for subsequent demodulation of the radiated beam within the propagation medium to create an audible beam; and (e-1) a level sensor that senses the level of the audio signal;

(e-2) the modulation depth of the modulated carrier and overall primary amplitude of the modulated carrier being controlled in response to the sensed level of the audio signal to (i) keep the modulation depth at or below a target value;

(ii) maintain an audible level of the audible beam corresponding to the level of the audio signal; and (iii) ensure that when there is no audio signal, there is little or no ultrasound output from the ultrasonic transducer;

wherein the frequency of the carrier is greater than 40 kHz.

8. A parametric audio generator comprising:

(a) an ultrasonic signal source providing a carrier;

(b) an audio signal source comprising a de-emphasis filter providing an audio signal;

(c) a modulator that responds to the carrier and the audio signal to form a modulated carrier having a modulation depth and overall primary amplitude, the frequency of the carrier being sufficiently high that frequency components of the modulated carrier with substantial intensity have a frequency above the range in which the human auditory system responds;

(d) an ultrasonic transducer that responds to the modulated carrier and radiates a modulated inaudible, primary ultrasonic beam into a propagation medium for subsequent demodulation of the radiated beam within the propagation medium to create an audible beam; and (e-1) a level sensor that senses the level of the audio signal;

(e-2) the modulation depth of the modulated carrier and the overall primary amplitude of the modulated carrier being controlled in response to the sensed level of the audio signal to (i) keep the modulation depth at or below a target value;

(ii) maintain an audible level of the audible beam corresponding to the level of the audio signal; and (iii) ensure that when there is no audio signal, there is little or no ultrasound output from the ultrasonic transducer;

wherein the modulation depth is maximized while being kept at or below a target value.

9. The parametric audio generator of claim 8, wherein the target value is one.

* * * * *